US012477292B2

(12) United States Patent
Landy

(10) Patent No.: US 12,477,292 B2
(45) Date of Patent: Nov. 18, 2025

(54) SYSTEMS AND METHODS FOR DETERMINING AUDIO CHANNELS IN AUDIO DATA

(71) Applicant: NBCUniversal Media, LLC, New York, NY (US)

(72) Inventor: Harvey Landy, Moorpark, CA (US)

(73) Assignee: NBCUniversal Media, LLC, New York, NY (US)

( * ) Notice: Subject to any disclaimer, the term of this patent is extended or adjusted under 35 U.S.C. 154(b) by 188 days.

(21) Appl. No.: 18/080,663

(22) Filed: Dec. 13, 2022

(65) Prior Publication Data

US 2024/0196148 A1 Jun. 13, 2024

(51) Int. Cl.
*H04S 5/00* (2006.01)
*H04R 5/04* (2006.01)

(52) U.S. Cl.
CPC ............... *H04S 5/005* (2013.01); *H04R 5/04* (2013.01)

(58) Field of Classification Search
CPC .................................. H04S 5/005; H04R 5/04
See application file for complete search history.

(56) References Cited

U.S. PATENT DOCUMENTS 5,918,223 A * 6/1999 Blum ...................... G06F 16/40
2007/0270988 A1* 11/2007 Goldstein ................ H04R 5/04 381/309
2012/0195433 A1* 8/2012 Eppolito ................ H04S 3/008 381/1
2014/0336800 A1* 11/2014 Radhakrishnan ..... G10L 19/018 700/94
2021/0099760 A1* 4/2021 Farre Guiu ........... G10L 15/005
2021/0174817 A1* 6/2021 Grauman ................ G10L 25/51
2022/0319526 A1* 10/2022 Guo .......................... H04S 7/30

* cited by examiner

*Primary Examiner* — Daniel R Sellers
(74) *Attorney, Agent, or Firm* — Fletcher Yoder, P.C.

(57) ABSTRACT

The current embodiments relate to an audio processing system that may determine the identity or type of audio channel of audio channels present in audio data. For instance, the audio processing system may include one or more processors that receive audio data that includes a plurality of audio channels, determine a respective type of audio channel for each respective audio channel of the plurality of audio channels, and generate characterized audio data indicative of the respective type of audio channel for each respective audio channel of the plurality of audio channels.

20 Claims, 7 Drawing Sheets

SYSTEMS AND METHODS FOR DETERMINING AUDIO CHANNELS IN AUDIO DATA

BACKGROUND

The present disclosure relates generally to the determination or classification of audio channels included in audio data, and, more particularly, to techniques that may be utilized to identify which type of audio channel corresponds to a particular set of audio data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Content, such as television, movie, film, audiobooks, songs, may include audio data that have multiple audio channels. For example, the audio data may be included in a multichannel audio file that includes channels for particular speakers of sets of speakers that are to generate sound corresponding to the audio data of the audio channels. For example, for 5.1 surround sound, a multichannel audio file may have six channels having one of the following channel types: (front) left, (front) right, center, low-frequency effects, surround left, and surround right. In some cases, the audio data may not indicate or be indicative of which type of channel (e.g., corresponding to a particular speakers or set of speakers) one or more sets of audio data correspond to. Traditionally, to ensure that the audio content is played back using the correct speakers, audio data is analyzed manually (e.g., by human analysts) to identify which type of channel a particular channel is. However, the traditional manual approach to characterize audio content may be labor intensive, time-consuming, inconsistent, inaccurate, and inefficient.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to systems and methods for characterizing audio data, for instance, by determining which type of audio channel a particular audio data set is associated with in a (multichannel) audio file, and whether a particular order or mode (e.g., film or Society of Motion Picture and Television Engineers (SMPTE)) of audio channels exist within the audio file. The techniques described below may additionally determine discrepancies in received audio data, such as the audio channels of the audio data being in an incorrect order or the audio channels being unsynchronized. In some embodiments, machine-learning may be employed to make such determinations. By utilizing the techniques described herein, and audio channels may be more efficiently, accurately, and quickly identified relative to manual analysis techniques.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, there exists an opportunity to more efficiently, quickly, and accurately, determine the audio channels in audio data, such as audio files. As discussed herein, machine-learning may be employed to process audio data to determine several characteristics of the audio data, such as which type of audio channel a particular set of audio data is associated with in a (multichannel) audio file, and whether a particular order or mode (e.g., film or SMPTE) of audio channels exists within the audio file. The techniques described below may additionally determine discrepancies in received audio data, such as the audio channels of the audio data being in an incorrect order or the audio channels being unsynchronized. By utilizing the techniques described herein, and audio channels may be more efficiently, accurately, and quickly identified relative to manual analysis techniques.

Figure 1:
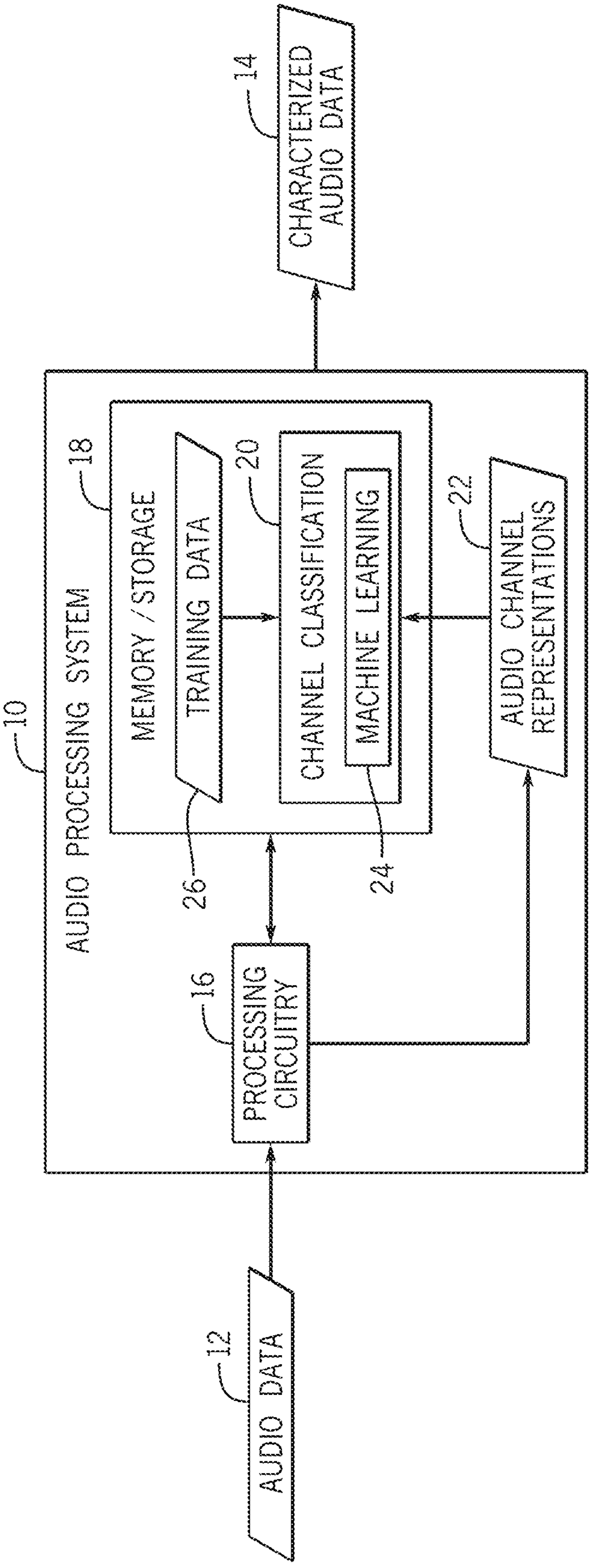
FIG. 1 is a block diagram of an audio processing system, in accordance with an embodiment of the present disclosure.

FIG. 1 is a schematic view of an audio processing system 10, in accordance with an embodiment of the present disclosure. As described below, the audio processing system 10 may receive audio data 12 (e.g., from a computing device or memory device) and generate characterized audio data 14. The audio data 12 may, for example, include one or more audio files (e.g., .WAV files or other audio file types) that include audio channels. That is, the audio data 12 may be a multitrack audio file having audio content (or data representative of the content) assigned to or associated with particular channels. For example, the audio data 12 may have three channels (e.g., 2.1 surround sound), six channels (e.g., for 5.1 surround sound), eight channels (for 7.1 surround sound), or any suitable number of channels that is two or greater. Techniques of the present application are discussed below with respect to audio data (e.g., the audio data 12) having six channels that may be played back using a 5.1 surround sound system. The six channels may be a (front) left channel, a center channel, a (front) right channel, low-frequency effects (LFE) channel, a surround left channel, and a surround right channel, with the audio for each channel being played by a speaker. For example, five speakers could be to play back the audio data of (front) left channel, the center channel, the (front) right channel, the surround left channel, and the surround right channel. A subwoofer may be utilized to play audio content for the LFE channel. In 7.1 surround sound systems, two extra speakers may be utilized to play back audio content included in two additional channels (e.g., a rear left channel and a rear right channel). In other embodiments, the audio data 12 may be suitable for any multi-channel sound systems, such as surround sound systems, and have fewer or more channels. For instance, the audio data 12 may have two channels (e.g., for 2.0 surround sound), three channels (e.g., for 2.1 surround sound or 3.0 surround sound), four channels (e.g., for 3.1 surround sound or 4.0 surround sound), five channels (e.g., for 4.1 surround sound or 5.0 surround sound), six channels (e.g., for 5.1 surround sound or 6.0 surround sound), seven channels (e.g., for 6.1 or 7.0 surround sound), twelve channels (e.g., for 11.1 surround sound), thirteen channels (e.g., for 11.2 surround sound), twenty-four channels (e.g., for 22.2 surround sound), twenty-six channels (e.g., for 22.4 surround sound), or more than twenty-four channels. Accordingly, while techniques of the present disclosure are described below with respect to a particular number of channels (e.g., six), the techniques of the present application may be used with any suitable audio data, such as audio data having more than one channel.

The characterized audio data 14 may be audio data (e.g., an audio file) that has metadata (e.g., as applied by the audio processing system 10) indicating which channels that audio channels of the audio data are. For example, in the context of the audio data 12 having six audio channels (e.g., channel 1, channel 2, channel 3, channel 4, channel 5, channel 6) the characterized audio data 14 may include metadata indicating which type of channel (e.g., (front) left, center, (front) right, LFE, surround left, surround right) each particular channel is. The characterized audio data 14 may also include metadata (applied by the audio processing system 10) indicating a particular order or order format of the audio channels of the audio data 12. For example, the characterized audio data 14 may include metadata indicative of the characterized audio data 14 having a particular mode, order, or order format, such a film order (e.g., (front) left, center, (front) right, surround left, surround right, LFE for content with six channels) or SMPTE order (e.g., (front) left, center, (front) right, LFE, surround left, surround right for content with six channels). As discussed below with respect to FIG. 7, the characterized audio data 14 may additionally or alternatively be a report or presentable representation of data indicative of the channels in the audio data 12, an order of the channels, whether the channels are synchronous, and other characteristics of the audio data 12.

The audio processing system 10, for instance, may be implemented utilizing a computing device or computing system (e.g., a cloud-based system). Accordingly, the audio processing system 10 may include processing circuitry 16 and memory/storage 18. The audio processing system 10 may also include suitable wired and/or wireless communication interfaces configured to receive the audio data 12, for example, from other computing devices or systems. The processing circuitry 16 may include one or more general purpose central processing units (CPUs), one or more graphics processing units (GPUs), one or more microcontrollers, one or more reduced instruction set computer (RISC) processors, one or more application-specific integrated circuits (ASICs), one or more programmable logic controllers (PLCs), one or more field programmable gate arrays (FPGAs), one or more digital signal processing (DSP) devices, and/or any combination thereof as well as any other circuit or processing device capable of executing the functions described herein. The memory/storage 18, which may also be referred to as "memory," may include a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. As such, the memory/storage 18 may include one or more non-transitory computer-readable media capable of storing machine-readable instructions that may be executed by the processing circuitry 16.

The memory/storage 18 may include a channel classification application 20 that may be executed by the processing circuitry 16 to generate the characterized audio data 14 from the audio data 12. More specifically, the processing circuitry 16 may generate audio channel representations 22 from the audio data 12 and execute the channel classification application 20 to analyze the audio channel representations 22 to generate the characterized audio data 14. While the audio channel representations 22 are discussed in more detail below, there may be one audio channel representation for each channel of the audio data 12, and the audio channel representations 22 may be any suitable computer-readable representations of the audio data 12 including, but not limited to, one or more graphs, one or more images, one or more waveforms, one or more spectrograms, or a combination thereof.

The channel classification application 20 may include a machine-learning module 24, (e.g., stored in the memory/storage 18), though it should be noted that, in other embodiments, the machine-learning module 24 may be kept elsewhere in the memory/storage 18 (e.g., not included in the channel classification application 20) in other embodiments. The machine-learning module 24 may include any suitable machine-learning algorithms to perform supervised learning, semi-supervised learning, or unsupervised learning, for example, using training data 26. The processing circuitry 16 may make the determinations discussed herein by executing the machine-learning module 24 to utilize machine-learning techniques to analyze the audio channel representations 22.

As used herein, machine-learning may refer to algorithms and statistical models that computer systems (e.g., including the audio processing system 10) use to perform a specific task with or without using explicit instructions. For example, a machine-learning process may generate a mathematical model based on a sample of data (e.g., the training data 26) in order to make predictions or decisions without being explicitly programmed to perform the task.

Depending on the inferences to be made, the machine-learning module 24 (or processing circuitry 16 executing the machine-learning module 24) may implement different forms of machine-learning. For example, in some embodiments (e.g., when particular known examples exist that correlate to future predictions or estimates that the machine-learning engine may be tasked with generating), a machine-learning engine (e.g., implemented by the processing circuitry 16) may implement supervised machine-learning. In supervised machine-learning, a mathematical model of a set of data contains both inputs and desired outputs. This data, which may be the training data 26, may include a set of training examples. Each training example may have one or more inputs and a desired output, also known as a supervisory signal. In a mathematical model, each training example is represented by an array or vector, sometimes called a feature vector, and the training data 26 may be represented by a matrix. Through iterative optimization of an objective function, supervised learning algorithms may learn a function that may be used to predict an output associated with new inputs. An optimal function may allow the algorithm to correctly determine the output for inputs that were not a part of the training data 26. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine (e.g., implemented by the processing circuitry 16) to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning module 24 may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning module 24 may implement other machine-learning techniques, such as those based on estimated density and graph connectivity.

Once the machine-learning module 24 is trained using the training data 26, the processing circuitry 16 may utilize the machine-learning module 24 to generate the characterized audio data 14. For example, the processing circuitry 16 may determine which types of channels the channels of the audio data 12 are and apply metadata indicative of which type of channel each of the channels is to the audio data 12 to generate the characterized audio data.

By automating the classification of audio channels of the audio data 12, time-consuming tasks that have typically required significant human subjectivity can be reduced. For example, automatic classification of the audio channels on the audio data 12 may be performed. This may result in audio channels being more accurately identified as well as higher-quality content (e.g., when content is played back by providing correct audio channel data to a corresponding speaker (or speakers) of a sound system (e.g., a surround sound system)).

Figure 2:
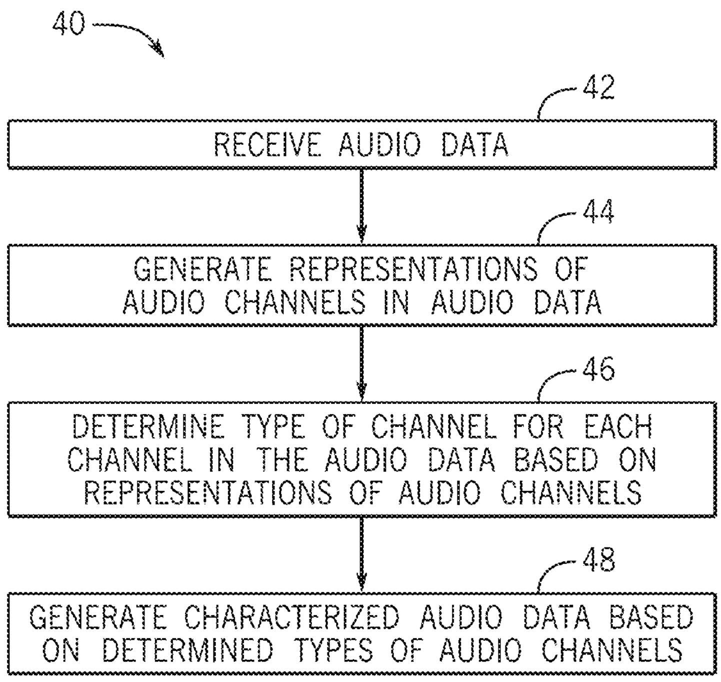
FIG. 2 is a flow diagram of a process for generating the characterized audio data of FIG. 1 from the audio data of FIG. 1, in accordance with an embodiment of the present disclosure.

Keeping the foregoing in mind, FIG. 2 is a flow diagram illustrating a process 40 in which the audio processing system 10 generates the characterized audio data 14 from received audio data 12. One or more operations of the process 40 may be performed by the processing circuitry 16 of the audio processing system 10, for example, by executing the channel classification application 20, the machine-learning module 24, or both the channel classification application 20 and the machine-learning module 24. As described below, the process 40 generally includes receiving audio data (process block 42), generating representations of audio channels in the received audio data (process block 44), determining a type of channel for each channel in the audio data based on the generated representations of the audio channels (process block 46), and generating characterized audio data based on the determined types of the audio channels (process block 48).

At process block 42, the processing circuitry 16 may receive the audio data 12. For example, the audio processing system 10 may be communicatively coupled to an electronic device (e.g., a computing device or a storage device) via a wired or wireless connection and receive the audio data 12 from such a device. In one embodiment, the processing circuitry 16 may receive the audio data 12 from a database or cloud-based storage system.

At process block 44, the processing circuitry 16 may generate representations of the audio channels in the audio data 12. In other words, the processing circuitry 16 may generate the audio channel representations 22. The processing circuitry 16 may generate an audio channel representation for each audio channel of the audio data 12. The audio channel representations 22 may be any suitable computer-readable representations of the audio data 12 including, but not limited to, one or more graphs, one or more images, one or more waveforms, one or more spectrograms, or a combination thereof. Thus, in an example in which there are six audio channels in the audio data 12, the processing circuitry 16 may generate six audio channel representations 22, such as the spectrograms 60 (referring collectively to spectrogram 60A, spectrogram 60B, spectrogram 60C, spectrogram 60D, spectrogram 60E, and spectrogram 60F). In particular, the spectrograms 60 include spectrogram 60A for a first audio channel of the audio data 12, spectrogram 60B for a second audio channel of the audio data 12, spectrogram 60C for a third audio channel of the audio data 12, spectrogram 60D for a fourth audio channel of the audio data 12, spectrogram 60E for a fifth audio channel of the audio data 12 of the audio data 12, and spectrogram 60F for a sixth audio channel of the audio data 12. Each of the spectrograms 60 may be indicative of frequency (e.g., as indicated by axis 62 over time (e.g., as indicated by axis 64). Furthermore, it should be noted that, in some embodiments, the processing circuitry 16 may generate multiple audio channel representations 22 for each channel. For example, the processing circuitry may generate audio channel representations 22 representative of a particular blocks of time (e.g., a particular number of frames of data, duration of audio content, portion of a file size, etc.). Accordingly, the processing circuitry 16 may process the audio data 12 to generate the audio channel representations 22 (e.g., the spectrograms 60).

Figure 4:
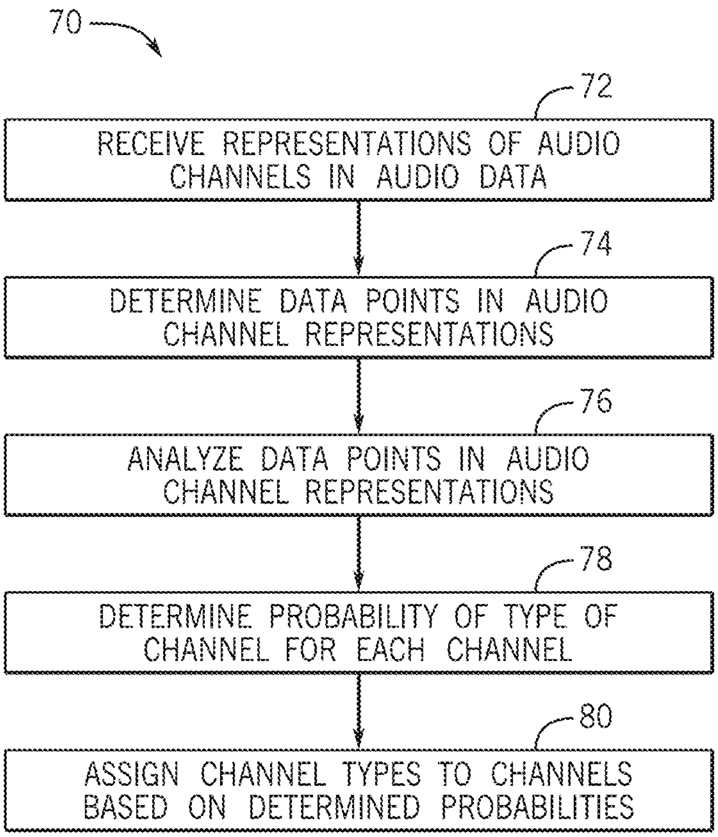
FIG. 4 is a flow diagram of a process for determining types of audio channels for audio channels in audio data, in accordance with an embodiment of the present disclosure.

Returning to FIG. 2 and the discussion of the process 40, at process block 46, the processing circuitry 16 may determine a type of channel for each channel in the audio data based on the generated representations of the audio channels. For instance, continuing with the example in which the audio data 12 has six audio channels, the processing circuitry 16 may determine which channel is the (front) left channel, which channel is the center channel, which channel is the (front) right channel, which channel is the LFE channel, which channel is the surround left channel, and which channel is the surround right channel. To help elaborate on how the processing circuitry 16 may determine the types of channels for the audio channels of the audio data 12, FIG. 4 is provided. In particular, FIG. 4 is a flow diagram of a process 70 for determining channel types of channels of audio data, such as audio channels of the audio data 12. One or more operations of the process 70 may be performed by the processing circuitry 16 of the audio processing system 10, for example, by executing the channel classification application 20, the machine-learning module 24, or both the channel classification application 20 and the machine-learning module 24. As discussed below, the process 70 generally includes receiving representations of audio channels in audio data (process block 72), determining data points in the audio channel representations (process block 74), analyzing the data points in the audio channel representations (process block 76), determining a probability of a channel being a particular type of channel for each channel of the audio data (process block 78), and assigning channel types of the channels based on the determined probabilities (process block 80).

At process block 72, the processing circuitry 16 (e.g., utilizing the channel classification application 20 and/or the machine-learning module 24) may receive the audio channel representations 22. In other embodiments, the operations of process block 72 may be performed by the processing circuitry at process block 44 of the process 40 in which the processing circuitry 16 may generate the audio channel representations 22.

Figure 5:
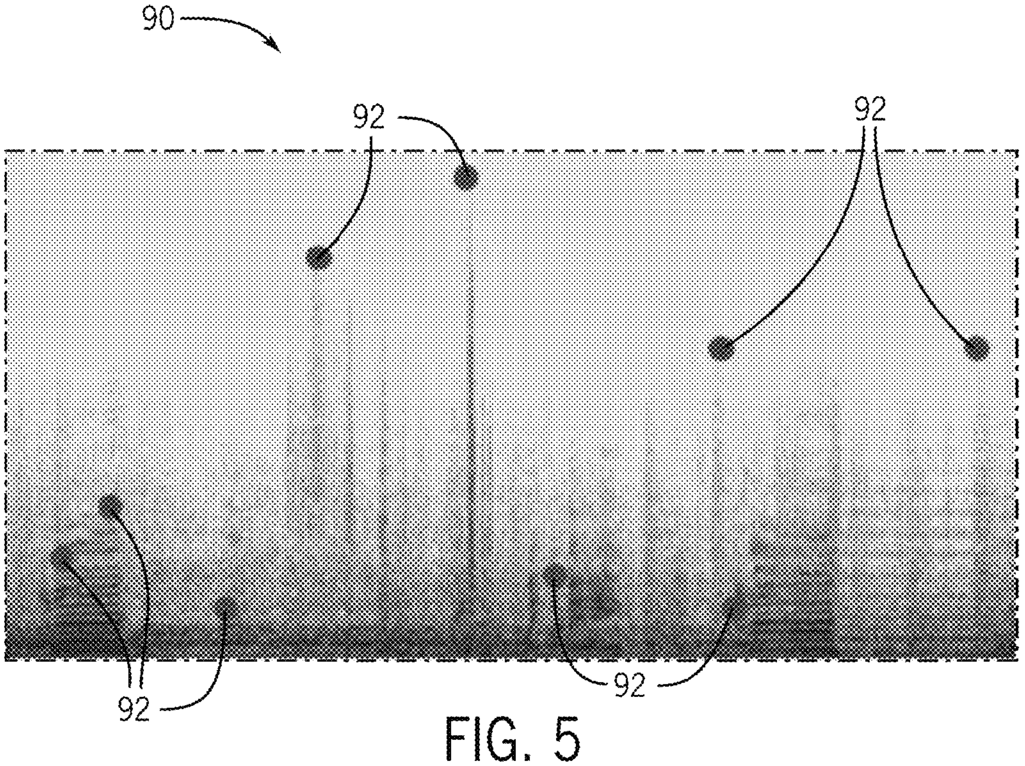
FIG. 5 is an audio channel representation of the third channel of the audio channel representations of FIG. 2, in accordance with an embodiment of the present disclosure.

At process block 74, the processing circuitry 16 may determine data points in the audio channel representations 22. For example, FIG. 5 illustrates a spectrogram 90 that is the spectrogram 60C that has data points 92 determined by the processing circuitry 16. In one embodiment, the data points 92 may include relative minima, relative maxima, an absolute minimum, an absolute maximum, or any combination thereof within an audio channel representation 22 (e.g., spectrogram 90) or a portion of an audio channel representation 22. In other embodiments, the data points 92 may include points other than local or absolute minima or maxima. Furthermore, it should be noted that while the spectrogram 90 of FIG. 5 includes nine data points 92, in other embodiments, any suitable number of data points 92 may be used. For example, ten, tens, or hundreds of data points 92 may be determined in each audio channel representation 22. Additionally, each spectrogram may have a different number of data points corresponding to the amount of audio data associated with the particular spectrogram. For example, the spectrogram 60C with more audio data may have more data points compared to the spectrograms 60A and 60B with less audio data.

Returning to FIG. 4 and the discussion of the process 70, at process block 76, the processing circuitry 16 may analyze the data points in the audio channel representations 22 determined at process block 74. For example, the processing circuitry 16, executing the channel classification application 20 and/or the machine-learning module 24, may analyze the data points in the audio channel representations 22 by comparing the audio channel representation 22 to the training data 26, which may include other audio channel representations (e.g., with known channels, including some samples in which channels may have been incorrectly ordered (e.g., not in film order or SMPTE order) in original audio data). In particular, the processing circuitry 16 may compare the data points 92 to data points in the training data 26 as well as data points in other audio channel representations of the audio channel representations 22. The processing circuitry 16 may also determine similarities between the data points 92 between the audio channel representations 22. For example, left and right (e.g., (front) left and (front) right, left surround and right surround, left rear and right rear) may have data peaks 92 with similar or the same frequencies, while the data peaks 92 for the one of audio channel representations 22 of such pairs (e.g., left, left surround, left rear) may be greater than the data peaks 92 for other corresponding audio channel (e.g., right, right surround, right rear, respectively). The processing circuitry 16 may also analyze the audio channel representations 22 (and audio data 12) based on an order of the channels of the audio data. For example, the processing circuitry 16 may analyze pairs of consecutive channels (or the audio channel representations 22 for such audio channels) to determine whether the pair of channels are similar left and right channels (e.g., the (front) left and (front) right channels, left surround and right surround channels, left rear and right rear channels). Additionally, the processing circuitry 16 may determine and analyze subframe offsets (e.g., an amount of time or subframes indicated between similar or matching data points in audio channel representations 22). For instance, for a data point in a first audio channel representation 22 having a particular value (e.g., frequency value) at time t, the processing circuitry 16 may determine whether a data point having that value (or a value within a threshold range of the value (e.g., 5% of the value)) occurs within a threshold amount of time of t or threshold number of subframes in another of the audio channel representations 22. When a data point having a similar frequency (or the same frequency) is present in another audio channel representation at a time within of the threshold, the processing circuitry 16 may determine the channel for the second audio channel representation is paired (e.g., in a left and right combination) with the first audio channel of the first audio channel representation and that the two audio channels are synchronous. When a data point having a similar frequency (or the same frequency) is present in another audio channel representation at a time outside of the threshold but within a second threshold, the processing circuitry 16 may determine that the channel for the second audio channel representation is paired (e.g., in a left and right combination) with the first audio channel of the first audio channel representation but that the two audio channels are asynchronous.

Figure 3:
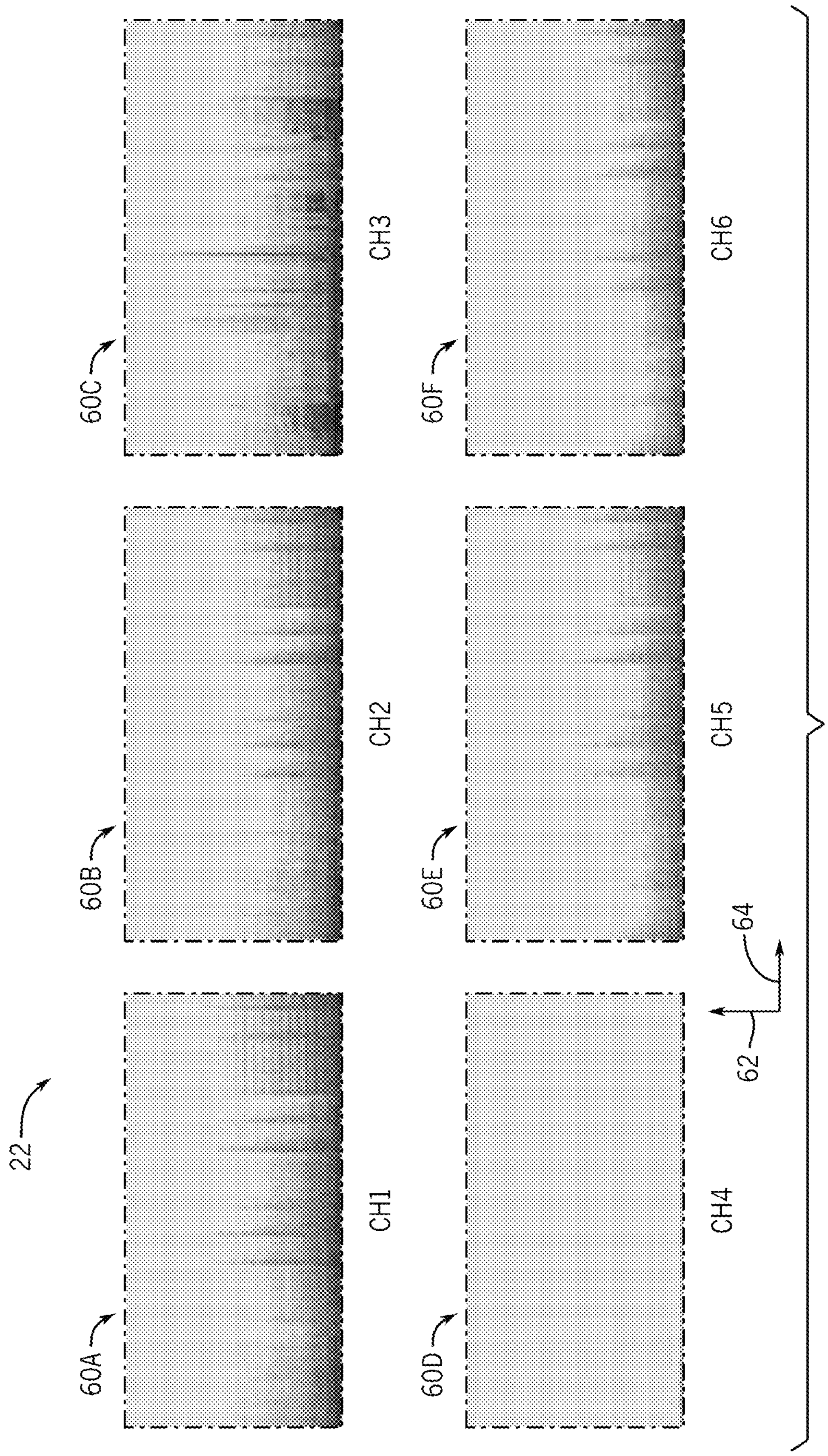
FIG. 3 illustrates the audio channel representations of FIG. 1, in accordance with an embodiment of the present disclosure.
Figure 6:
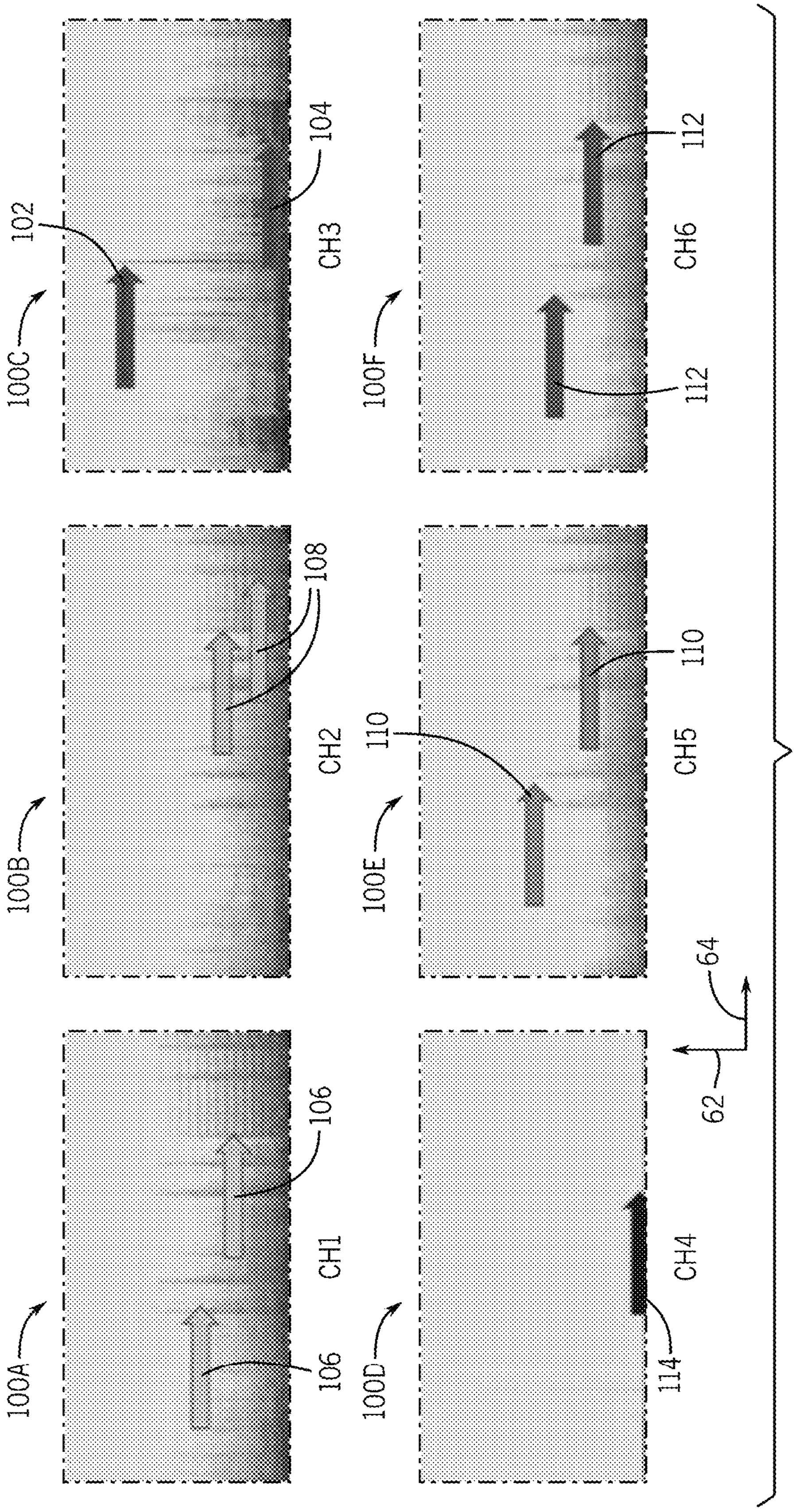
FIG. 6 illustrates annotated audio channel representations, in accordance with an embodiment of the present disclosure.

The processing circuitry 16 may also analyze the data points 92 to determine the types of audio channels based on data points 92 corresponding to maxima in the audio channel representations 22 and whether the audio data represented in the audio channel representations 22 is indicative of dialogue. For example, FIG. 6 illustrates spectrograms 100 (referring collectively to spectrogram 100A, spectrogram 100B, spectrogram 100C, spectrogram 100D, spectrogram 100E, spectrogram 100F) corresponding to the spectrograms 60 of FIG. 3. In particular, the spectrograms 100 are annotated versions (e.g., using arrow) of the spectrograms 60 having annotations to help illustrate how types of audio channels may be assigned (e.g., preliminarily identified prior to process block 80 described below) to audio channels.

For example, spectrogram 100C corresponding to a third audio channel of the audio data 12 may have a maximum (e.g., peak) data point representing the highest values (e.g., frequency values) of local and/or absolute maxima of the data points 92 (as indicated by arrow 102) among the spectrograms 100. Furthermore, the spectrogram 100C may be indicative of the audio data 12 including dialogue (as indicated by arrow 104). Accordingly, the processing circuitry 16 may preliminarily (and ultimately) identify the third audio channel as being the center channel, at least in part, on the features that the spectrogram 100C has the maximum data point and/or the most data points among the spectrograms 100.

The processing circuitry 16 may also identify pairs (e.g., left and right channels, surround left and surround right channels, rear left and rear right channels) based on the data points. For instance, the processing circuitry 16 may identify a first audio channel corresponding to the spectrogram 100A as being the (front) left channel based on data points (indicated by arrows 106) based on the maximum values of the data values of the spectrogram 100A being the next highest in value. The processing circuitry 16 may identify a second audio channel corresponding to the spectrogram 100B as being the (front) right channel based on data points (indicated by arrows 108) having maximum values most similar to (and less than) those of the spectrogram 100A. In an aspect, after channel pairs are identified (e.g., based on the similarities of their data points), the processing circuitry 16 may identify which channel among the channel pair is the front channel pair versus the surround channel pair. For example, the front channel pair may tend to include more data points than the surround channel pair, and therefore, the processing circuitry 16 may classify the channel pair with more data points as the front channel pair and the remaining channel pair as the surround channel pair. As between the left and right channels corresponding to the front channel pair, the processing circuitry 16 may use techniques to identify which is the left versus the right channel. In an aspect, the processing circuitry 16 may utilize machine learning to identify common differences between front left and front right channels and use those differences to classify the channels within the front channel pair. For example, the front left channel may have more data points than the front right channel (or vice versa). In another expect, the front left channel may have more high frequency and/or more low frequency data points compared to the front right channel (or vice versa). Similar techniques may be used to distinguish between the surround left and surround right channels.

Somewhat similarly, the processing circuitry 16 may identify a fifth audio channel corresponding to the spectrogram 100E as being the surround left channel based on data points (indicated by arrows 110) based on the maximum values of the data values of the spectrogram 100E being the next highest in value. The processing circuitry 16 may identify a sixth audio channel corresponding to the spectrogram 100F as being the surround right channel based on data points (indicated by arrows 112) having maximum values most similar to (and less than) those of the spectrogram 100E.

Lastly, in the example provided in FIG. 6, the processing circuitry 16 may identify a fourth channel corresponding to the spectrogram 100D as being the LFE channel due to the spectrogram 100D having maxima (e.g., local maxima) data points that are the lowest in value (e.g., along the axis 62) among the spectrograms 100 (as indicated by arrow 114). The order in which the channels are identified is for illustrative purposes, and the processing circuitry 16 may identify the audio channels in any other order, including first identifying the LFE channel.

The processing circuitry 16 may also determine that the format of the audio data 12, in the example provided in FIG. 6, is an SMPTE 5.1 format because there are six channels and the order of the channels (i.e., front left, front right, center, LFE, surround left, surround right) matches the order that the channels would have in an SMPTE 5.1 format.

Returning to FIG. 4 and the discussion of the process 70, at process block 78, the processing circuitry 16 may determine a probability of a channel being a particular type of channel for each channel of the audio data 12. For instance, the processing circuitry 16 may determine, based on comparing the data points 92 to the training data and/or other data points 92 of the spectrograms 60, probabilities for each channel represented by each spectrogram 60 corresponding to one or more types of channels. For instance, the processing circuitry 16 may determine that the spectrogram 60A most likely corresponds to the first channel (i.e., "Ch1") being the (front) left channel, and may assign a probability of the first channel being the (front) left channel. The processing circuitry 16 may determine such a probability for each of the channels. In another embodiment, the processing circuitry 16 may determine multiple probabilities for each channel. For example, for 5.1 surround sound audio, the processing circuitry 16 may determine probabilities of a given channel being the (front) left channel, the (front) right channel, the center channel, the LFE channel, the surround left channel, and the surround right channel.

At process block 80, the processing circuitry 16 may assign channel types of the channels based on the probabilities determined at process block 78. For example, the processing circuitry 16 may assign a channel as being a particular type of channel based on the probability of the channel having a highest value for being the particular channel type (e.g., among the probabilities determined at process block 78).

Returning to FIG. 2 and the discussion of the process 40, at process block 48, the processing circuitry may generate the characterized audio data 14 based on the determined types of the audio channels. Referring to FIG. 1, as described above, the characterized audio data 14 may be audio data (e.g., an audio file) that has metadata (e.g., as applied by the audio processing system 10) indicating which channels are associated with different sets or representations of the audio data. For example, in the context of the audio data 12 having six audio channels (e.g., channel 1, channel 2, channel 3, channel 4, channel 5, channel 6) the characterized audio data 14 may include metadata (e.g., data tags) indicating which type of channel (e.g., (front) left, center, (front) right, LFE, surround left, surround right) each particular channel or audio data set corresponds to. The characterized audio data 14 may also include metadata (applied by the audio processing system 10) indicating a particular order or order format of the audio channels of the audio data 12. For example, the characterized audio data 14 may include metadata indicative of the characterized audio data 14 having a particular mode, order, or order format, such a film order (e.g., (front) left, center, (front) right, surround left, surround right, LFE for content with six channels) or SMPTE order (e.g., (front) left, center, (front) right, LFE, surround left, surround right for content with six channels).

Figure 7:
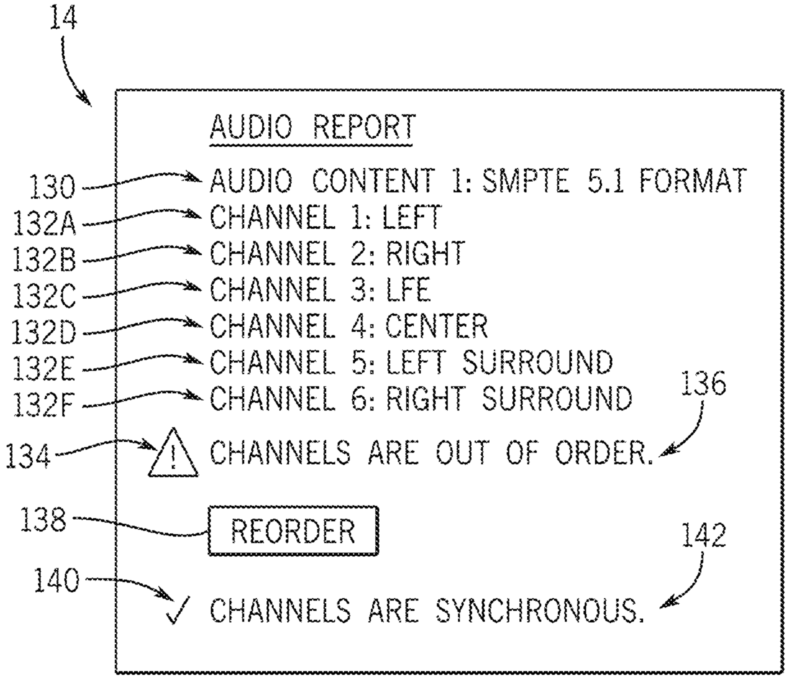
FIG. 7 is a block diagram illustrating an example of the characterized audio data of FIG. 1, in accordance with an embodiment of the present disclosure.

In other embodiments, additionally or alternatively, the characterized audio data 14 may be or include data that is visually presentable, for example, in the form of a user interface, report, or image that is presentable on an electronic display. Bearing this in mind, FIG. 7 illustrates an example embodiment of the characterized audio data 14 in which the characterized audio data 14 is image and/or text-based and displayable on an electronic display. As illustrated, the characterized audio data 14 includes a mode indicator 130, channel indicators 132 (referring collectively to channel indicator 132A, channel indicator 132B, channel indicator 132C, channel indicator 132D, channel indicator 132E, channel indicator 132F), a channel order indicator 134, a channel order message 136, a selectable channel reordering element 138, a channel synchronicity indicator 140, and a channel synchronicity message 142.

The mode indicator 130 may indicate an order format of the audio data 12 as determined by the processing circuitry 16 (e.g., during performance of the process 40). The mode indicator may be indicative of the number of audio channels in the audio data 12. For example, in the illustrated embodiment, the "5.1" is indicative of the audio data 12 having six channels. More specifically, the "5.1" is indicative of the audio data 12 having five full bandwidth channels and one LFE channel. The "SMPTE" is indicative of the six channels of the audio data 12 having the SMPTE order format described above. In other embodiments, the mode indicator 130 may indicate another mode, such as film mode, or another number of channels.

The channel indicators 132 may include a channel indicator 132 for each channel of the audio data 12 (e.g., as determined to be present in the audio data 12 by the processing circuitry 16) that indicates which channel (e.g., type of channel) a particular channel of the audio data 12 is. For example, in the illustrated example, the channel indicator 132A indicates that a first channel is the (front) left channel, the channel indicator 132B indicates that a second channel is the (front) right channel, the channel indicator 132C indicates that a third channel is the LFE channel, the channel indicator 132D indicates that a fourth channel is the center channel, the channel indicator 132E indicates that a fifth channel is the left surround channel, and the channel indicator 132F indicates that a sixth channel is the right surround channel.

The channel order indicator 134 may indicate whether the channels are in the correct order, with the correct order being the order the channels should have according to the format indicated by the mode indicator 130. For instance, for SMPTE 5.1 content, the first channel should be the (front) left channel, the second channel should be the (front) right channel, the third channel should be the center channel, the fourth channel should be the LFE channel, the fifth channel should be the left surround channel, and the sixth channel should be the right surround channel. In the illustrated embodiment, the third channel is the LFE channel (as indicated by the channel indicator 132C), and the fourth channel is the center channel, meaning the channels do not have the correct order. As such, the channel order indicator 134 is indicative of the channels being out of order. Somewhat similarly, the channel order message 136 indicates that the channels are out of order. In some embodiment, the channel order message 136 may indicate which channels are out order. Additionally, upon determining that the channels are in the correct order, the processing circuitry 16 may cause a different symbol to be utilized as the channel order indicator 134, such as a check mark (as used for the channel synchronicity indicator 140). Also, when the channels have the correct order, the channel order message 136 may indicate that the channels have the correct order.

The characterized audio data 14 may also include a selectable channel reordering element 138, which may be a graphical user interface (GUI) item that may be selected by a user (e.g., using an input device such as a mouse or keyboard or, for touchscreen displays, a finger or stylus) to cause the processing circuitry 16 to reorder the channels to have the correct order. For example, in response to receiving an input indicative of a selection of the selectable channel reordering element 138, the processing circuitry 16 may generate audio data (e.g., another form of the characterized audio data 14) that includes the channels in the correct order and, in some embodiments, metadata indicating the identity (e.g., type of channel) of each of the channels of the generated audio data.

As also illustrated, the characterized audio data 14 may include the channel synchronicity indicator 140 and the channel synchronicity message 142, which may both indicate whether the audio channels are synchronous or not. For example, in the illustrated embodiment, the channel synchronicity indicator 140 is a check mark, and the channel synchronicity message 142 states that the channels of the audio data 12 are synchronous. When the audio channels of the audio data 12 are asynchronous, the channel synchronicity indicator 140 may be different, such as an error symbol like the channel order indicator 134, and the channel synchronicity message 142 may indicate that the channels are asynchronous. More specifically, the channel synchronicity message 142 may indicate which channel or channels are asynchronous from other channels (e.g., one or two channels being asynchronous from five or four other channels of the audio data 12 in the example of the audio data 12 being for 5.1 surround sound systems).

Accordingly, the presently disclosed techniques enable the identities (e.g., types) of audio channels of audio content to be identified. Additionally, as described above, the techniques provided herein enable a format of the audio content (e.g., corresponding to an order of the audio channels) to be identified. As also discussed herein, the presently disclosed techniques may be utilized to determine whether audio channels are synchronized and in an order consistent with a determined format of the audio content.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A non-transitory machine-readable medium comprising machine-readable instructions that, when executed by one or more processors, cause the one or more processors to:

receive audio data comprising a plurality of audio channels, wherein the plurality of audio channels comprises at least a pair of channels comprising a left channel and a right channel;

generate a plurality of audio channel representations of the plurality of audio channels;

determine a respective type of audio channel for each respective audio channel of the plurality of audio channels based on an analysis of the plurality of audio channel representations, wherein determining a respective type of audio channel for each respective audio channel comprises determining which of the pair of channels is the left channel and which of the pair of channels is the right channel based on a number of data points in each audio channel representation; and generate characterized audio data indicative of the respective type of audio channel for each respective audio channel of the plurality of audio channels.

2. The non-transitory machine-readable medium of claim 1, wherein the plurality of audio channel representations comprise visual representations of respective portions of the audio data for each respective audio channel of the plurality of audio channels.

3. The non-transitory machine-readable medium of claim 2, wherein the plurality of audio channel representations comprises a plurality of spectrograms.

4. The non-transitory machine-readable medium of claim 1, wherein the instructions, when executed, cause the one or more processors to determine the respective type of audio channel for each respective audio channel of the plurality of audio channels using one or more machine-learning techniques.

5. The non-transitory machine-readable medium of claim 1, wherein the plurality of audio channels comprises left, center, right, low-frequency effects, surround left, and surround right.

6. The non-transitory machine-readable medium of claim 1, wherein the instructions, when executed, cause the one or more processors to generate the characterized audio data by applying, to the audio data, metadata indicative of the respective type of audio channel for each respective audio channel of the plurality of audio channels.

7. The non-transitory machine-readable medium of claim 1, wherein the instructions, when executed, cause the one or more processors to generate the characterized audio data by generating a visual representation indicative of:

the plurality of audio channels; and the respective type of audio channel for each respective audio channel of the plurality of audio channels.

8. The non-transitory machine-readable medium of claim 1 comprising machine-readable instructions that, when executed by one or more processors, cause the one or more processors to:

determine a mode of the plurality of audio channels; and order the characterized audio data indicative of the respective type of audio channel for each respective audio channel according to the mode.

9. A machine-implemented method for analyzing audio data, the method comprising:

receiving, via one or more processors, audio data comprising a plurality of audio channels, wherein the plurality of audio channels comprises at least a pair of channels comprising a left channel and a right channel;

generating, via the one or more processors, a plurality of audio channel representations of the plurality of audio channels;

determining, via the one or more processors, a respective type of audio channel for each respective audio channel of the plurality of audio channels based on the plurality of audio channel representations, wherein determining a respective type of audio channel for each respective audio channel comprises determining which of the pair of channels is the left channel and which of the pair of channels is the right channel based on a number of data points in each audio channel representation; and generating, via the one or more processors, characterized audio data indicative of the respective type of audio channel for each respective audio channel of the plurality of audio channels.

10. The machine-implemented method of claim 9, wherein the plurality of audio channel representations are indicative of frequencies of the audio data in the plurality of audio channels.

11. The machine-implemented method of claim 10, wherein determining the respective type of audio channel for each respective audio channel of the plurality of audio channels comprises:

determining, via the one or more processors, a plurality of data points in the plurality of audio channel representations; and analyzing, via the one or more processors, the plurality of data points.

12. The machine-implemented method of claim 11, wherein analyzing the plurality of data points comprises utilizing, via the one or more processors, one or more machine-learning techniques to compare the plurality of data points to training data.

13. The machine-implemented method of claim 11, wherein:

the plurality of data points comprise a plurality of absolute maximum data points, wherein each audio channel representation of the plurality of audio channel representations comprises a respective absolute maximum data point of the plurality of absolute maximum data points;

analyzing the plurality of data points comprises comparing, via the one or more processors, the absolute maximum data points of the plurality of absolute maximum data points to one another; and assigning at least one audio channel type to at least one audio channel of the plurality of audio channels based on comparing the absolute maximum data points of the plurality of absolute maximum data points to one another.

14. The machine-implemented method of claim 11, comprising determining, via the one or more processors:

a first audio channel representation of the plurality of audio channel representations corresponding to a first audio channel of the plurality of audio channels includes a first data point corresponding to a second data point of the plurality of data points in a second audio channel representation of the plurality of audio channel representations corresponding to a second audio channel of the plurality of audio channels; and whether the first audio channel and the second audio channel are synchronous.

15. The machine-implemented method of claim 14, wherein:

the first audio channel representation is indicative of a first time at which the first data point occurs;

the second audio channel representation is indicative of a second time at which the second data point occurs; and determining whether the first audio channel and the second audio channel are synchronous comprises determining whether the first time and the second time occur within a threshold amount of time of one another.

16. The machine-implemented method of claim 9, comprising:

determining, via the one or more processors, a respective probability for each respective audio channel of the plurality of audio channels, wherein the respective probability is indicative of a likelihood of the respective audio channel being the respective type of audio channel; and determining, via the one or more processors, the respective type of audio channel for each respective audio channel of the plurality of audio channels based on the respective probability.

17. An audio processing system, comprising:

one or more processors configured to:

receive audio data comprising a plurality of audio channels, wherein the plurality of audio channels comprises at least a pair of channels comprising a left channel and a right channel;

generate a plurality of spectrograms of the plurality of audio channels, wherein each spectrogram of the plurality of spectrograms is indicative of a frequency of a portion of the audio data for an audio channel of the plurality of audio channels;

determine, via the one or more processors, a respective type of audio channel for each respective audio channel of the plurality of audio channels based on the plurality of spectrograms, wherein determining a respective audio channel for each respective audio channel comprises determining which of the pair of channels is the left channel and which of the pair of channels is the right channel based on a number of data points in each audio channel representation; and generate characterized audio data indicative of the respective type of audio channel for each respective audio channel of the plurality of audio channels.

18. The audio processing system of claim 17, wherein the one or more processors are configured to:

determine a first order in which the audio channels of the plurality of audio channels occur in the audio data;

determine a format for a second order of the audio channels of the plurality of audio channels;

determine whether the first order and the second order are equivalent; and indicate whether the first order and the second order are equivalent or modify the first order to be equivalent to the second order.

19. The audio processing system of claim 18, wherein the plurality of audio channels comprises left, center, right, low-frequency effects, surround left, and surround right.

20. The audio processing system of claim 19, wherein the plurality of audio channels comprises rear left and rear right.

* * * * *